United States Patent
Aleem et al.

(10) Patent No.: US 11,042,031 B2
(45) Date of Patent: Jun. 22, 2021

(54) EYE TRACKING SYSTEM AND METHOD, EYEGLASS LENS, AND WEARABLE HEADS-UP DISPLAY

(71) Applicant: GOOGLE LLC, Mountain View, CA (US)

(72) Inventors: Idris S. Aleem, Kitchener (CA); Andrew S. Logan, Waterloo (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/269,385

(22) Filed: Feb. 6, 2019

(65) Prior Publication Data
US 2019/0258062 A1    Aug. 22, 2019

Related U.S. Application Data

(60) Provisional application No. 62/632,785, filed on Feb. 20, 2018.

(51) Int. Cl.
| | |
|---|---|
| *G06F 3/01* | (2006.01) |
| *G02B 26/12* | (2006.01) |
| *G02B 27/00* | (2006.01) |
| *G02B 27/01* | (2006.01) |
| *G02B 26/10* | (2006.01) |
| *G02B 5/20* | (2006.01) |

(52) U.S. Cl.
CPC ......... *G02B 27/0172* (2013.01); *G02B 5/203* (2013.01); *G02B 26/101* (2013.01); *G02B 26/12* (2013.01); *G02B 27/0093* (2013.01); *G02B 27/0176* (2013.01); *G06F 3/013* (2013.01); *G02B 2027/0174* (2013.01); *G02B 2027/0178* (2013.01)

(58) Field of Classification Search
None
See application file for complete search history.

(56) References Cited

U.S. PATENT DOCUMENTS

2016/0018639 A1* 1/2016 Spitzer ................. G02B 5/3083
                                                              345/156
2016/0349514 A1* 12/2016 Alexander ............... G02B 5/32

* cited by examiner

*Primary Examiner* — Stephen T. Reed (57) ABSTRACT

An eye tracking system for tracking an eye of a user includes at least one infrared laser diode to output an infrared light and an optical scanner positioned to receive the infrared light outputted by the at least one infrared laser diode and controllable to scan the infrared light over a target area. A holographic optical element is positioned at the target area to receive the infrared light from the optical scanner and redirect the infrared light to the eye of the user. An infrared detector is aligned to detect at least a portion of the infrared light returned from the eye of the user. An infrared filter is disposed in a position to selectively block transmission of infrared wavelengths through the holographic optical element from a side of the holographic optical element. An eyeglass lens, a wearable heads-up display, and a method of eye tracking are also described.

25 Claims, 8 Drawing Sheets

EYE TRACKING SYSTEM AND METHOD, EYEGLASS LENS, AND WEARABLE HEADS-UP DISPLAY

CROSS-REFERENCE TO RELATED APPLICATIONS

This application claims benefit of U.S. Provisional Application No. 62/632,785, filed Feb. 20, 2018, the disclosure of which is incorporated herein in its entirety by reference.

TECHNICAL FIELD

The disclosure generally relates to eye tracking technologies and particularly relates to eye tracking technologies for wearable heads-up displays.

BACKGROUND

A wearable heads-up display is a head-mounted display that enables the user to see displayed content but does not prevent the user from being able to see the external environment of the user. The display component of a wearable heads-up display is either transparent or at a periphery of the user's field of view so that it does not completely block the user from being able to see the external environment.

Eye tracking is a process by which one or more of position, orientation, and motion of an eye may be measured or monitored. In many applications, this is done with a view towards determining the gaze direction of a user. There are various techniques for measuring the position, orientation, and/or motion of the eye, the least invasive of which employs one or more optical sensors, e.g., cameras, to optically track the eye. Common techniques involve illuminating or flooding the entire eye, all at once, with infrared light and measuring reflections from the eye with at least one optical sensor that is tuned to be sensitive to the infrared light. Information about how the infrared light is reflected from the eye is analyzed to determine the position, orientation, and/or motion of one or more eye features such as the cornea, pupil, iris, and/or retinal blood vessels.

Eye tracking functionality is highly advantageous in wearable heads-up displays. Some examples of the utility of eye tracking in wearable heads-up displays include influencing where content is displayed in the user's field of view, conserving power by not displaying content that is outside of the user's field of view, influencing what content is displayed to the user, determining where the user is looking or gazing, determining whether the user is looking at displayed content on the display or through the display at the external environment, and providing a means through which the user may control or interact with displayed content.

However, incorporating eye tracking functionality in a wearable heads-up display conventionally adds unwanted bulk to the system. Eye tracking systems available today generally implement multiple dedicated components with very stringent positioning requirements, which undesirably increase the overall size and form factor of the system when incorporated into a wearable heads-up display. There is a need in the art for systems, devices, and methods of eye tracking that can integrate into wearable heads-up displays with minimal effect on the size and form factor of the system.

SUMMARY

An eye tracking system for tracking an eye of a user may be summarized as including at least one infrared laser diode to output an infrared light, an optical scanner positioned to receive the infrared light outputted by the at least one infrared laser diode and controllable to scan the infrared light over a target area, a holographic optical element positioned at the target area to receive the infrared light scanned by the optical scanner and to redirect the infrared light in a direction of the eye of the user, an infrared detector aligned to detect at least a portion of the infrared light returned from the eye, and an infrared filter disposed in a position to selectively block transmission of infrared wavelengths through the holographic optical element from a side of the holographic optical element.

The infrared filter may have characteristics to block transmission of infrared wavelengths in a select range of infrared wavelengths to which the infrared detector is sensitive.

The infrared detector may be aligned to receive the at least a portion of the infrared light returned from the eye from the holographic optical element. An additional infrared filter may be disposed in a path through which the infrared detector receives infrared light from the holographic optical element, and the additional infrared filter may have characteristics to remove unwanted infrared wavelengths from the infrared light detected by the infrared detector.

The holographic optical element has a back side that faces the eye and a front side opposite to the back side that faces away from the eye, and the infrared filter is disposed on or proximate the front side. The infrared filter may be physically coupled to the front side of the holographic optical element.

The eye tracking system may include at least one transparent lens having a body, and the holographic optical element may be embedded in the body of the at least one transparent lens. The infrared filter may be embedded in the body of the at least one transparent lens or disposed on a surface of the body of the at least one transparent lens.

The holographic optical element may include at least one infrared hologram that is responsive to infrared light and unresponsive to visible light. The holographic optical element may further include at least one visible hologram that is responsive to visible light and unresponsive to infrared light.

The eye tracking system may include at least one visible laser diode to output a visible light. The optical scanner may be positioned to receive both the infrared light outputted by the at least one infrared laser diode and the visible light outputted by the at least one visible laser diode.

An eyeglass lens may be summarized as including a holographic optical element, an infrared filter disposed in a position to selectively block transmission of infrared wavelengths through the holographic optical element from a side of the holographic optical element, and a transparent lens having a body, wherein the holographic optical element and the infrared filter are physically coupled to the body.

The holographic optical element and the infrared filter may be embedded in the body of the transparent lens.

The holographic optical element may be embedded in the body of the transparent lens, and the infrared filter may be disposed on a surface of the body of the transparent lens.

The holographic optical element may include at least one infrared hologram that is responsive to infrared light and unresponsive to visible light. The holographic optical element may further include at least one visible hologram that is responsive to visible light and unresponsive to infrared light.

A wearable heads-up display having a field of view may be summarized as including a head wearable support frame that when worn positions the field of view with respect to at least one eye, at least one infrared laser diode coupled to the support frame and operable to output an infrared light, and at least one visible laser diode coupled to the support frame and operable to output a visible light. The wearable heads-up display may include at least one scan mirror coupled to the support frame and aligned to receive both the infrared light from the at least one infrared laser diode and the visible light from the at least one visible diode. The at least one scan mirror may controllably reflect both the infrared light and the visible light. The wearable heads-up display may include a holographic optical element coupled to the support frame and aligned to couple both the infrared light and the visible light from the at least one scan mirror to the eye of the user. The wearable heads-up display may include an infrared detector coupled to the support frame and aligned to detect at least a portion of infrared light returned from the eye of the user. The wearable heads-up display may include an infrared filter disposed in a position to selectively block transmission of infrared wavelengths through the holographic optical element from a side of the holographic optical element.

The wearable heads-up display may include at least one transparent lens coupled to the support frame. The holographic optical element may be embedded in a body of the at least one transparent lens. The infrared filter may be embedded in the body of the at least one transparent lens or disposed on a surface of the body of the at least one transparent lens.

The support frame may include a front frame and a pair of arms coupled to opposite sides of the front frame. The infrared detector may be mounted on one of the arms of the support frame.

The infrared detector may be aligned to receive the at least a portion of infrared light returned from the eye from the holographic optical element.

A method for tracking an eye of a user may be summarized as including outputting an infrared light, controllably reflecting the infrared light by at least one scan mirror, receiving the infrared light reflected by the at least one scan mirror at a first side of a holographic optical element and redirecting the infrared light to the eye of the user by the holographic optical element, selectively blocking transmission of infrared light through the holographic optical element from a second side of the holographic optical element by an infrared filter disposed on or proximate the second side, detecting at least a portion of infrared light returned from the eye of the user, and determining a position of at least one feature of the eye based on the at least a portion of infrared light detected from the eye of the user.

The holographic optical element in the method may include at least one hologram that is responsive to infrared light and unresponsive to visible light.

The at least a portion of infrared light returned from the eye of the user may be detected by detecting infrared light reflected from the holographic optical element.

The at least a portion of infrared light returned from the eye of the user may be detected by an infrared detector. The method may include selectively blocking transmission of infrared wavelengths to which the infrared detector is sensitive.

The infrared light outputted may be in a select subset of the infrared range, and the method may include filtering unwanted infrared wavelengths from the at least a portion of infrared light detected from the eye of the user. The unwanted infrared wavelengths may be infrared wavelengths outside of the select subset of the infrared range.

The foregoing general description and the following detailed description are exemplary of various embodiments of the invention(s) and are intended to provide an overview or framework for understanding the nature of the invention(s) as it is claimed. The accompanying drawings are included to provide further understanding of various embodiments of the invention(s) and are incorporated in and constitute part of this specification. The drawings illustrate various embodiments of the invention(s) and together with the description serve to explain the principles and operation of the invention(s).

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following description, certain specific details are set forth in order to provide a thorough understanding of various disclosed implementations and embodiments. However, one skilled in the relevant art will recognize that implementations and embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the implementations or embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise. For the sake of continuity and conciseness, the same reference numbers may appear in multiple figures where they refer to the same features.

In this disclosure, unless the context requires otherwise, throughout the specification and claims which follow, the word "comprise" and variations thereof, such as, "comprises" and "comprising" are to be construed in an open, inclusive sense, that is as "including, but not limited to."

In this disclosure, reference to "one implementation" or "an implementation" or to "one embodiment" or "an embodiment" means that a particular feature, structures, or characteristics may be combined in any suitable manner in one or more implementations or one or more embodiments.

In this disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the disclosure provided herein are for convenience only and do not interpret the scope or meaning of the embodiments.

Throughout this specification, the term "infrared" will be understood to include "near infrared" and will generally refer to a wavelength of light that is longer than the largest wavelength of light that is typically visible to the average human eye. Light that is visible to the average human eye, i.e., "visible light" herein, is generally in the range of 400 nm-700 nm. Thus, as used herein, the term "infrared" refers to a wavelength that is greater than 700 nm, up to 1 mm.

Figure 1A:
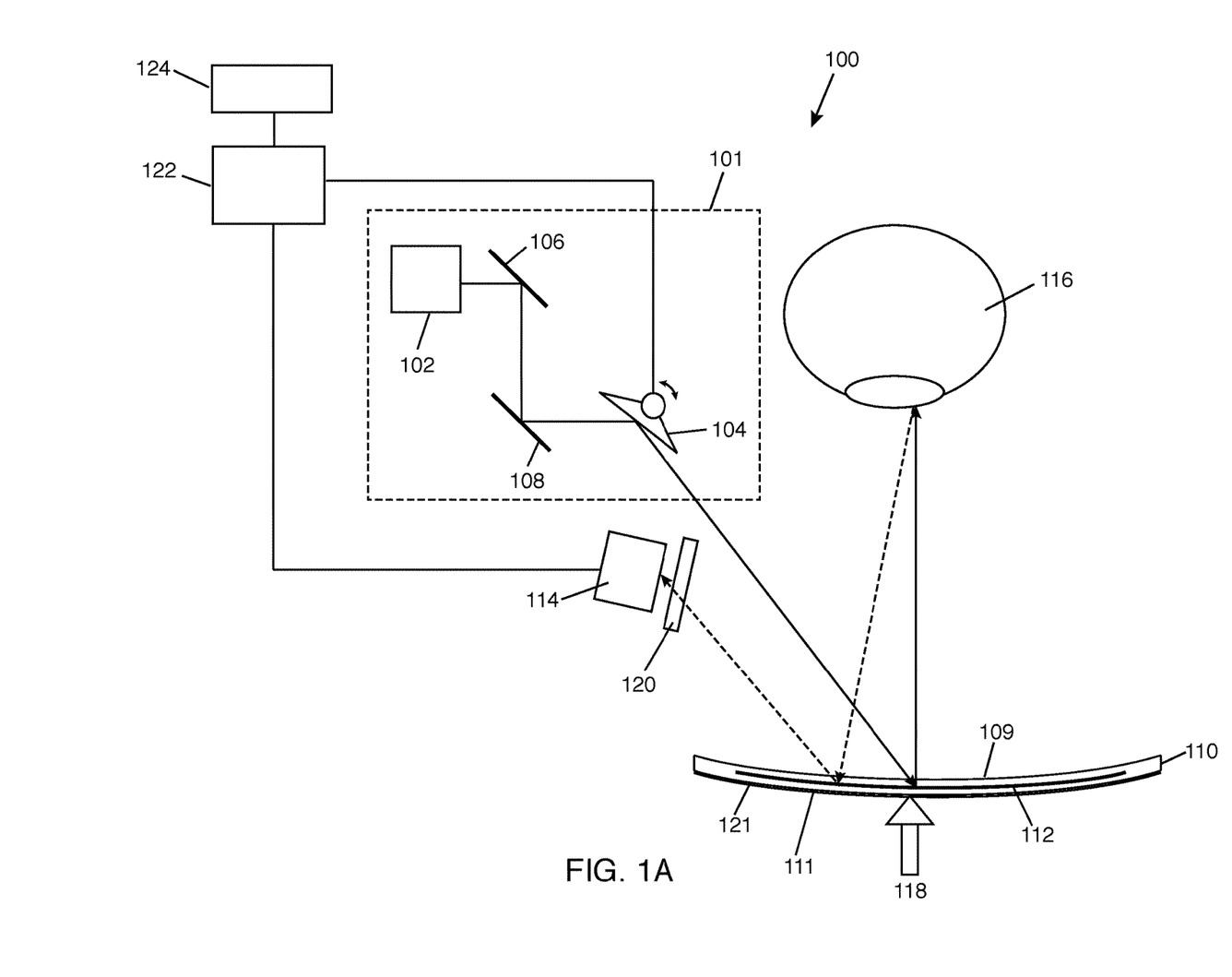
FIG. 1A is a schematic diagram showing a system for eye tracking.

FIG. 1A is an illustrative diagram of a system 100 for tracking an eye 116 of a user. In one implementation, system 100 includes a scanning laser projector 101 for scanning infrared light over an area. In one example, scanning laser projector 101 includes an infrared laser diode 102 that provides infrared light. Infrared laser diode 102 may generate a continuous beam of infrared light or may be modulated to generate a sequence or pattern of infrared light. Although FIG. 1A shows only one infrared laser diode 102, scanning laser projector 101 may have more than one infrared laser diode to provide infrared light. Therefore, system 100 is not restricted to having only one infrared laser diode. Moreover, in some implementations, system 100 may use a different source of infrared light besides an infrared laser diode.

Scanning laser projector 101 may include an optical scanner 104 that is positioned, oriented, and operable to scan the infrared light from the infrared laser diode 102 over eye 116 in a predetermined pattern. In one example, optical scanner 104 may be a scan mirror, hereafter referred to as scan mirror 104. In some examples, scanning laser projector 101 may include optics 106, 108, such as beam splitters and the like, for redirecting the infrared light provided by infrared laser diode 102 to scan mirror 104. In general, scan mirror 104 can be thought of as a mirror or reflector capable of scanning light over a surface. In one example, scan mirror 104 may be a two-dimensional scan mirror operable to scan in two directions, for example by oscillating or rotating with respect to two axes. In another example, scan mirror 104 may be two orthogonally-oriented mono-axis mirrors. The mirrors included in scan mirror 104 may be microelectromechanical systems (MEMS) mirrors, piezoelectric mirrors, and the like. In another implementation, scanning laser projector 101 may have more than one scan mirror 104. In another implementation, scanning laser projector 101 may use a mirrorless optical scanner, such as fiber optic scanner, or a combination of mirror and mirrorless optical scanning elements.

Depending on the modulation of infrared laser diode 102, scan mirror 104, or other suitable optical scanner, may scan infrared light over a substantially continuous surface of eye 116 or may scan infrared light to form an illumination pattern, such as grid pattern, crosshairs pattern, and the like, on the surface of eye 116. Generally, in order for the scan mirror 104 to scan the infrared light over eye 116, scan mirror 104 may sweep through a range of orientations. For a plurality of orientations of the scan mirror 104, scan mirror 104 may receive infrared light from infrared laser diode 102 and reflect the infrared light into a respective region of the eye 116.

System 100 may include a holographic optical element (HOE) 110 aligned to receive infrared light from scanning laser projector 101 and redirect the infrared light to eye 116. In general, HOE is an optical element that is produced using holographic principles and processes. In one implementation, HOE 110 may include a single volume of holographic material, e.g., photopolymer and/or a silver halide compound, which encodes, carries, has embedded therein or thereon, or generally includes at least one hologram 112 that is responsive to infrared light and unresponsive to visible light. "Responsive," herein, means that the hologram redirects at least a portion of the light, where the magnitude of the portion depends on the playback efficiency of the hologram. "Unresponsive," herein, means that the hologram transmits the light, generally without modifying the light. Hologram 112 may be responsive to the entire infrared range or to a subset of the infrared range. For example, hologram 112 may be responsive to a select infrared wavelength+/− some margin, e.g., 10% or 15% margin.

System 100 includes an infrared detector 114 positioned, oriented, and operable to detect at least a portion of a reflection of infrared light from eye 116. As used herein, the term "infrared detector" refers to a device that is sensitive and responsive to infrared light and that provides signals responsive to sensing or detecting infrared light. In one implementation, the infrared detector 114 is a photodiode or photodetector that is responsive to infrared light. In another implementation, the infrared detector 114 may be an array of photodetectors that are responsive to infrared light. In yet another implementation, the infrared detector 114 may be a complementary metal-oxide semiconductor (CMOS) camera having an array of sensors that are responsive to light in the infrared range. Although FIG. 1A shows only one infrared detector 114, system 100 may have more than one infrared detector, which may be at different positions relative to HOE 110.

Figure 1B:
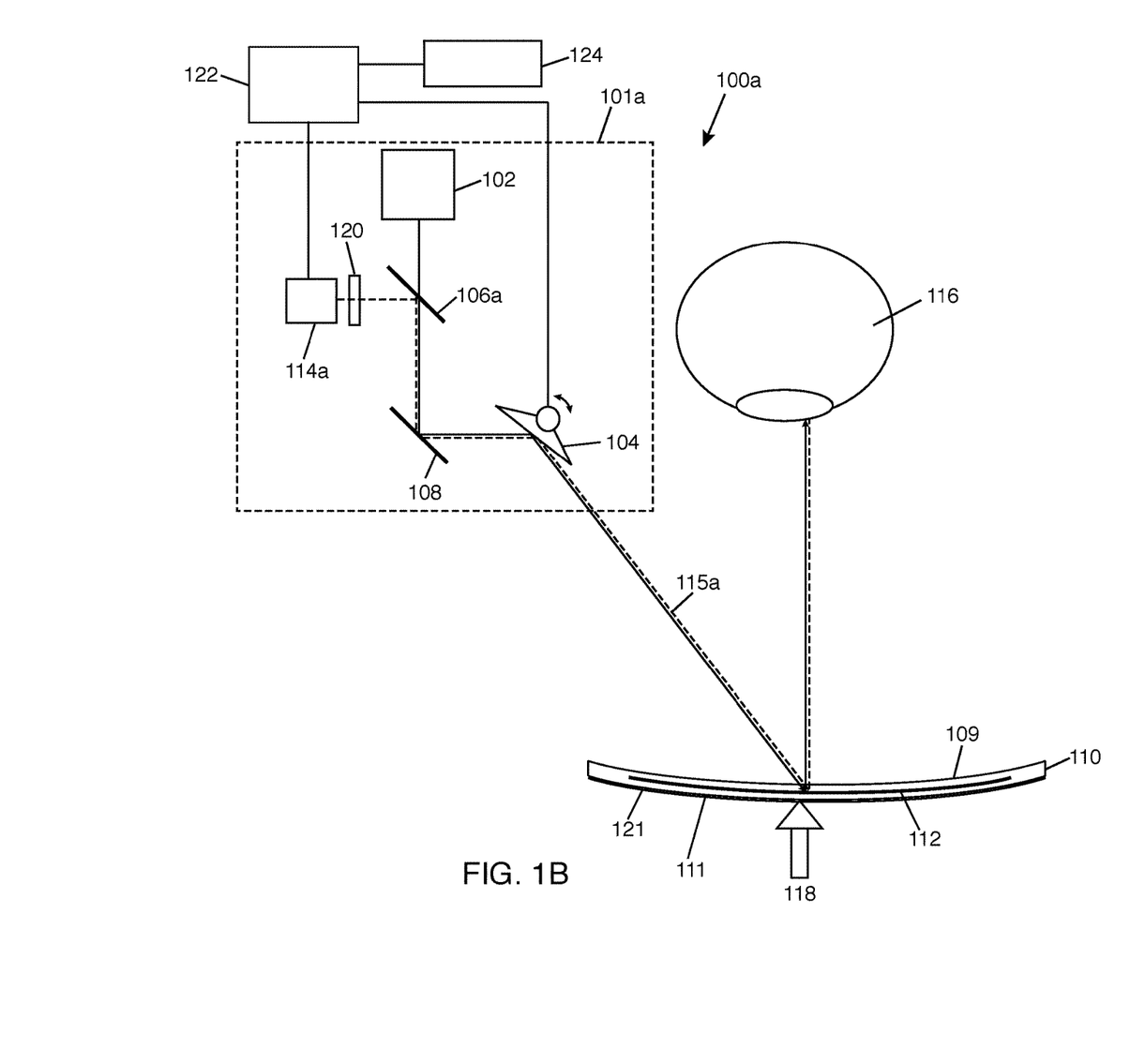
FIG. 1B is a schematic diagram showing a system for eye tracking including an infrared detector integrated with a scanning laser projector.

Infrared detector 114 may detect reflections of infrared light directly and/or indirectly from eye 116. In one example, infrared detector 114 detects reflections of infrared light from HOE 110, which is aligned to receive reflections of infrared light from eye 116. In some cases, reflections of infrared light from eye 116 may reach the infrared detector 114 directly, i.e., without intervention of HOE 110. Where the infrared detector 114 is generally aligned to detect reflections of infrared light from HOE 110, the reflections that reach infrared detector 114 directly from eye 116 may be different in intensity compared to the reflections that reach infrared detector 114 from HOE 110 such that it is possible to distinguish where each detected reflection is coming from. In another example, as shown in FIG. 1B, infrared detector 114a may be integrated into scanning laser projector 101a such that the path 115a through which infrared detector 114a receives reflections of infrared light from eye 116 generally follows the path through which eye 116 receives infrared light from scan mirror 104. This alternate arrangement may result in losses in the detected light, i.e., losses from intervening optics, which may need to be mitigated by, for example, increasing the power output of the infrared laser diode 102.

Returning to FIG. 1A, HOE 110 may be described as having a back side (or back surface) 109 and a front side (or front surface) 111. Throughout this specification, the term "back side of HOE" refers to the side of HOE that is to be closest to the eye or to face the eye during use. The term "front side of HOE" refers to the side of HOE that is opposite to the back side and that is to be farthest from the eye or to face the "world" during use. In use, infrared light from scan mirror 104 impinges on back side 109 of HOE 110. HOE 110 receives the infrared light and redirects the infrared light to eye 116. Redirection of the infrared light to eye 116 is by infrared hologram 112 in HOE 110. In one example, hologram 112 in HOE 110 takes the collection of beams emitted by the scanning laser projector 101 and makes the beams substantially parallel to one another, hence collimating. However, in this case, any particular beam that comes out of hologram 112 is not collimated. Instead the beam is being focused down onto the iris, which makes the function of hologram 112 somewhat different from the collimating function that is imposed onto a single beam. One or more features on a surface of eye 116, such as pupil, iris, cornea, sclera, and the like, reflect the infrared light that eye 116 receives. In another example, hologram 112 may be a focusing hologram, and the infrared light directed to the eye 116 may be projected onto the retina of eye 116—it is worth noting that the focusing geometry that puts the infrared light onto the retina only has an appreciable returning signal in the geometry shown in FIG. 1B. In either example of hologram, at least a portion of the reflection from eye 116 is received by HOE 110 and detected by infrared detector 114.

HOE 110 is sufficiently optically transparent to allow ambient light 118 to pass through. This means that the infrared light detected by infrared detector 114 may be a combination of infrared light reflected from eye 116 and infrared wavelengths from the ambient light 118. The infrared light redirected to eye 116 by HOE 110 may also be influenced by infrared light from ambient light 118. This "ambient infrared light," i.e., infrared light from sources other than the infrared laser diode 102, may induce noise in the measurements made by infrared detector 114. To reduce this noise, an infrared filter 121 is disposed in a position to block transmission of infrared light through HOE 110 from front side 111. For example, infrared filter 121 may be disposed on or proximate front side 111 to block transmission of infrared light through HOE 110 from front side 111. Infrared filter 121 may be an optically transparent coating or thin film structure or material that blocks infrared light, e.g., by reflecting and/or absorbing infrared light, while allowing transmission of other light, such as visible light. Infrared filter 121 may block all infrared wavelengths or a select subset of the infrared range. For example, if the infrared detector 114 is sensitive or responsive to a subset of the infrared range, infrared filter 121 may be selective of or block the subset of the infrared range to which the infrared detector 114 is sensitive or responsive.

In another example, an infrared filter 120 may be positioned in the receiving path between the infrared detector 114 and HOE 110, or may be integrated with infrared detector 114, to allow only select infrared wavelengths to be detected by infrared detector 114. For example, if infrared laser diode 102 works within a narrow band of the infrared range, infrared filter 120 may be selected to filter infrared wavelengths outside of this narrow band from the infrared light detected by infrared detector 114. Infrared filter 120 may be used together with infrared filter 121 in system 100 for a robust noise reduction in the measurements made by infrared detector 114.

System 100 may include one or more processors 122 that execute processor-executable instructions and one or more non-transitory storage medium or memory 124 that are communicatively coupled to the processor(s) and that store computer- or processor-executable instructions and data. Processor(s) 122 may take the form of any of a variety of analog and/or digital circuitry, for example micro-controllers, single or multi-core microprocessors, central processing units (CPUs), digital signal processors (DSPs), graphics processing units (GPUs), application specific integrated circuits (ASICs), field programmable gate arrays (FPGSs), programmable logic controllers (PLUs), analog-to-digital converters (ADCs). Processor(s) 122 may include nontransitory processor readable media, for example one or more registers. Processor(s) 122 may additionally include or be coupled to other nontransitory processor readable media, for example one or more volatile memory arrays (e.g., RAM) or non-volatile memory arrays (e.g., ROM, FLASH), and/or spinning media (e.g., magnetic hard disk, optical disk).

Processor 122 may receive infrared light measurements from infrared detector 114 and use the measurements to determine a position of one or more features of eye 116 at the time the measurements were made. Processor 122 may also receive information about the orientation of the scan mirror 104 for each measurement made by the infrared detector 114 and use the orientation of the scan mirror 104 and measurement made by the infrared detector 114 to determine a position of one or more features of eye 116 at the time the measurement was made.

In one implementation, scan mirror 104 scans infrared light over eye 116 based on modulation of infrared laser diode 102, and infrared detector 114 detects an intensity pattern or map of reflected infrared light that depends on the position/orientation of eye 116. That is, each distinct orientation of scan mirror 104 may result in a respective intensity of reflected infrared light being detected by the infrared detector 114 that depends on the position/orientation of eye 116 (or the position/orientation of feature(s) of eye 116, such as the cornea, iris, pupil, retina, and so on). The intensity pattern/map detected by infrared detector 114 depends on where eye 116 is looking and enables the gaze direction and movements of eye 116 to be measured and tracked.

In one implementation, the system measures, senses, detects, identifies, or otherwise determines the intensity of infrared light reflected from eye and uses this information to identify when the intensity of a detected infrared reflection exceeds a threshold value. A detected infrared reflection that exceeds the threshold value is used herein because such generally corresponds to a spectral reflection for the eye known as the first Purkinje image or glint. The glint provides a useful, reliable, and sufficient detection feature for the purpose of determining the gaze direction of the eye of the user. Thus, only detected reflections that correspond to glints are used to determine the gaze direction of the eye. However, the entire collection of detected reflections of the infrared light from the eye can be useful in other applications.

Figure 2A:
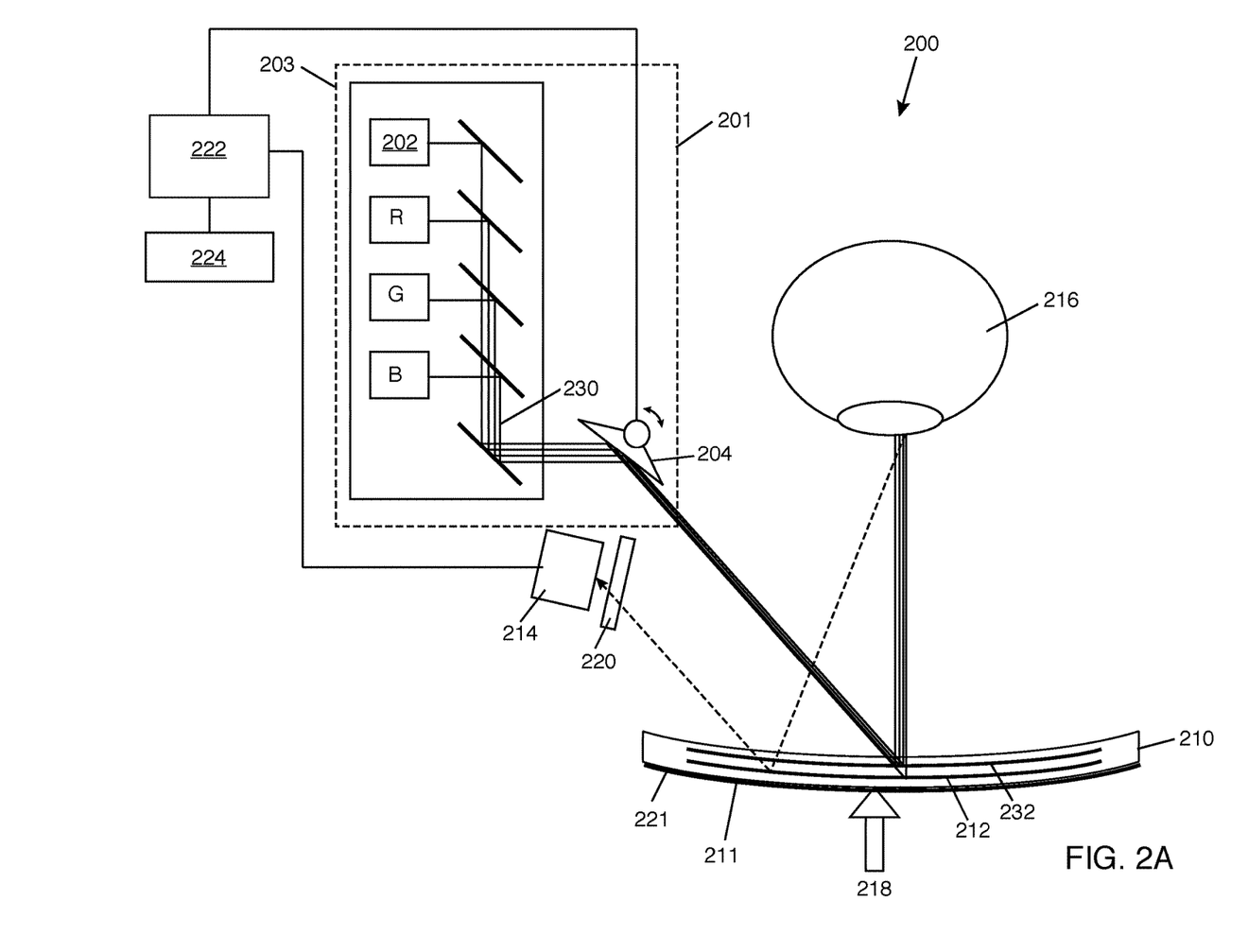
FIG. 2A is a schematic diagram showing a system for content display and eye tracking.

FIG. 2A is an illustrative diagram showing a system 200 for tracking an eye 216 of a user and displaying content to the eye 216. System 200 includes a scanning laser projector 201, which includes a laser module 203 and a scan mirror 204. Laser module 203 includes an infrared laser diode 202, red laser diode R, green laser diode G, and blue laser diode B. However, laser module 203 is not restricted to the particular number and combination of laser diodes shown in FIG. 2A. In general, laser diode 203 may have any desired combination and number of infrared and visible laser diodes to provide infrared light and visible light. The beams of the visible laser diodes R, G, B and the beam of the infrared laser diode 202 may be combined and aligned in a single beam 230. Scan mirror 204, which may have any of the characteristics described above for scan mirror 104 (in FIGS. 1A and 1B), is operable to scan both infrared light and visible light over eye 216. In one implementation, scan mirror 204 is aligned to receive beam 230.

System 200 includes HOE 210 having at least one infrared hologram 212 that is responsive to infrared light and unresponsive to visible light and at least one visible hologram 232 that is responsive to visible light and unresponsive to infrared light, where responsive and unresponsive has the meaning previously described with respect to hologram 112 (in FIGS. 1A and 1B). HOE 210 may include a single volume of holographic material, e.g., photopolymer and/or silver halide compound, that encodes, carries, has embedded therein or thereon, or generally includes both holograms 212, 232. Alternatively, HOE 210 may include at least two distinct layers of holography material, e.g., photopolymer and/or a silver halide compound, that are laminated or generally layered together, a first layer of holographic material that includes hologram 212 and a second layer of hologram that includes hologram 232. Where HOE 210 has more than one hologram 232 that is responsive to visible light and unresponsive to infrared light, the multiple holograms may be multiplexed in a variety of ways, such as a red hologram that is responsive to only red light from the red laser diode R, a green hologram that is responsive to only green light from the green laser diode G, and a blue hologram that is responsive to only blue light from the blue laser diode B, angle multiplexed, phase multiplexed, spatially multiplexed, temporally multiplexed, and so on.

When HOE 210 redirects visible light, hologram 232 may apply a first optical power to the visible light. The first optical power may be a positive optical power that focuses or converges the visible light to, for example, an exit pupil having a diameter less than 1 cm at eye 216 for the purpose of providing a clear and focused image with a wide field of view. When HOE 210 redirects infrared light, the hologram 212 may apply a second optical power to the infrared light. The second optical power may be less than the first optical power so that the hologram 212 redirects infrared light over an area of eye 216 that is larger than the exit pupil of visible light.

Figure 2B:
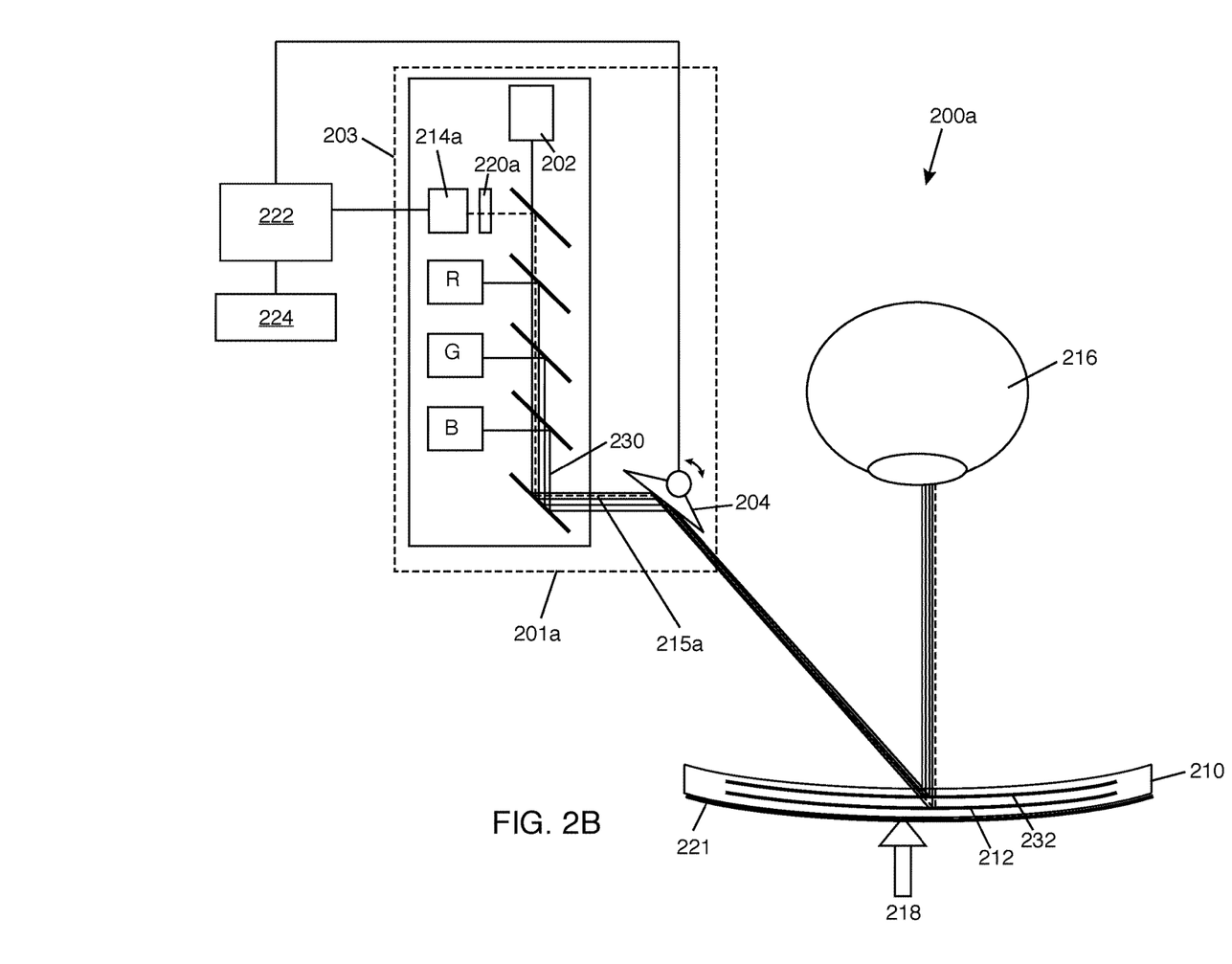
FIG. 2B is a schematic diagram showing a system for content display and eye tracking including an infrared detector integrated with a scanning laser projector.

System 200 includes an infrared detector 214 positioned, oriented, and operable to detect infrared light reflected from HOE 210. In the example shown in FIG. 2A, infrared detector 214 is positioned to receive infrared light directly from HOE 210, i.e., without intervention of optical elements that deflect or redirect the infrared light. Alternatively, as shown in example system 200a in FIG. 2B, infrared detector 214a may be integrated into scanning laser projector 201a such that infrared detector 214a relies on optics of the scanning laser projector 201a, e.g., scan mirror 204, to receive infrared light from HOE 210. The return path of the infrared light is shown generally by dashed line 215a.

Returning to FIG. 2A, system 200 may include an infrared filter 220 positioned in the path through which infrared detector 214 receives reflected infrared light from HOE 210, or the infrared filter 220 may be integrated with the receiving end of the infrared detector 214. (Similarly, system 200a in FIG. 2B may include an infrared filter 220a in the path through which infrared detector 214a receives infrared light from HOE 210.) Infrared filter 220 (220a in FIG. 2B) may serve to allow only desired infrared wavelengths, such as infrared wavelengths due to reflection of infrared light from eye 216, to reach a receiving end of infrared detector 214 (214a in FIG. 2B). Infrared filter 221 may also be applied to a front side 211 of HOE 210, or positioned proximate front side 211 of HOE 210, for the same purpose described for infrared filter 121 (in FIG. 1A). Infrared filter 221 may have the same properties as described for infrared filter 121. System 200 may include one or more processors 222 that execute processor-executable instructions, which may be content display instructions and/or eye tracking instructions, and one or more non-transitory storage medium (or memory) 224 that are communicatively coupled to the processor(s) and that store computer- or processor-executable instructions and data.

In operation, scan mirror 204 repeatedly scans, oscillates, pivots or rotates over a range of orientations (e.g., entire range of orientations) while the visible laser diodes R, G, B provide visible light corresponding to pixels of a scanned image or, generally, "displayed content." At the same time, infrared laser diode 202 may be activated to illuminate the eye with infrared light. Depending on the implementation, infrared laser diode 202 may be modulated to provide an illumination pattern, e.g., grid, a set of parallel lines, a crosshair, or any other shape/pattern, on eye 216. Because infrared light is invisible to eye of the user, infrared light does not interfere with the scanned image being projected with the visible light. The infrared light scanned over the eye 216 is reflected off the eye 216. At least a portion of the infrared light reflected off the eye 216 is received by HOE 210 and reflected to infrared detector 214. Infrared detector 214 detects an intensity pattern or map of the reflected infrared light that depends on the position/orientation of eye 216. For each orientation of the scan mirror 204, processor 222 uses the measurement by infrared detector 214 to determine a position of one or more features of eye 216.

Figure 3:
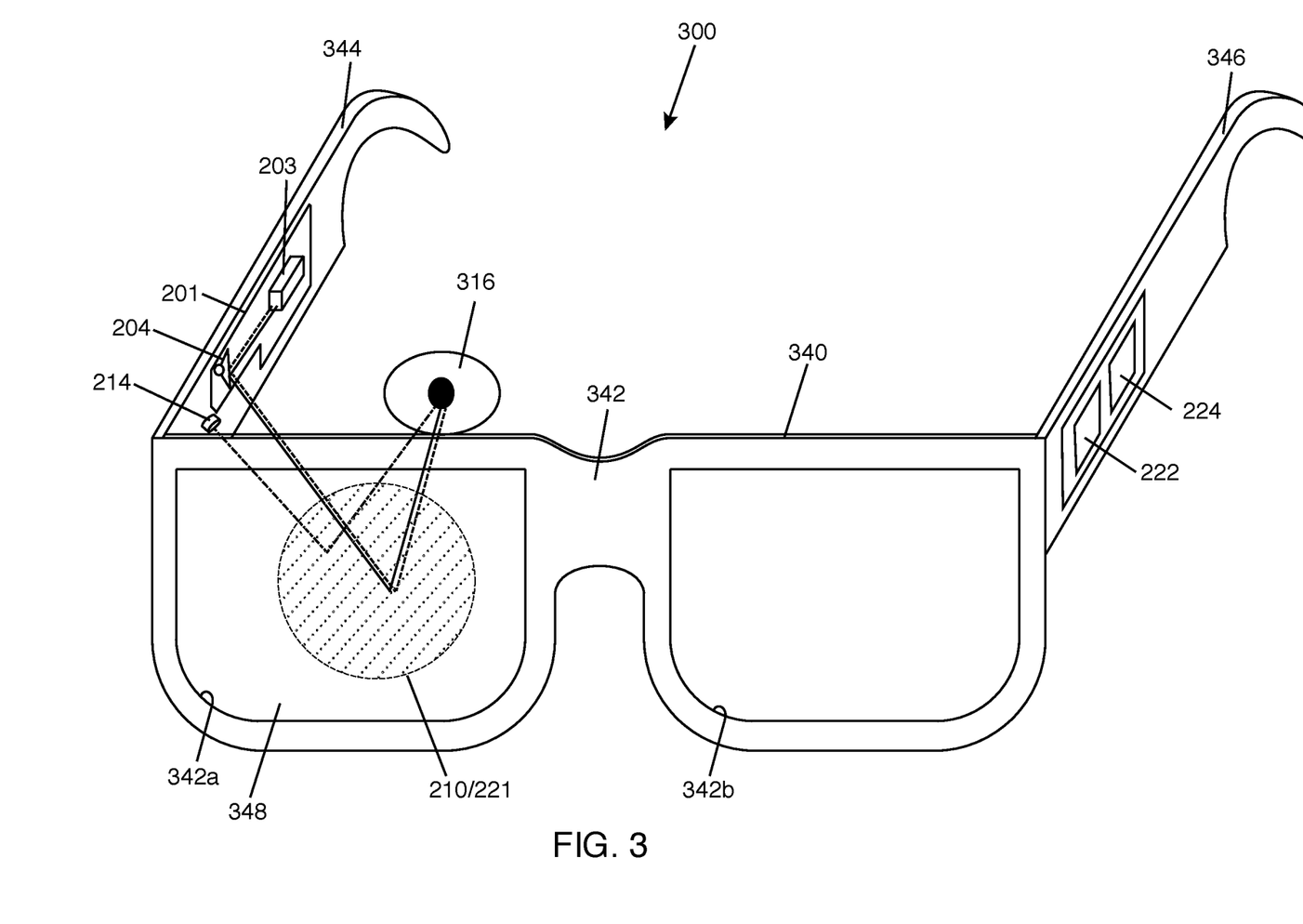
FIG. 3 is a perspective view of a wearable heads-up display positioned relative to an eye.

FIG. 3 is a perspective view of a wearable heads-up display (WHUD) 300 using the components of system 200. In the illustrated example, WHUD 300 has a general shape of a pair of eyeglasses. However, it is possible for WHUD 300 to have other forms, such as visor on a helmet, goggles, and the like. WHUD 300 has a support frame 340 including a front frame 342 and a pair of arms (or temples) 344, 346 coupled to the sides of the front frame 342. The front frame 342 has lens mounts 342a, 342b for supporting a pair of lenses. In one example, a transparent lens 348 is mounted in lens mount 342a. HOE 210/infrared filter 221 may be integrated in lens 348. HOE 210 may include at least one layer of holographic material that is adhered to, affixed to, laminated with, carried in or upon, or otherwise integrated with lens 348. IR filter 221 is disposed on or proximate a side of HOE 210 as previously described with reference to FIGS. 2A and 2B. Examples of integrating HOE/infrared filter with a lens are described in FIGS. 6A-6C and 7.

Scanning laser projector 201 is mounted on arm 344. Scan mirror 204 of scanning laser projector 201 is aligned with HOE 210 such that HOE 210 can receive infrared light and visible light from scan mirror 204. In the illustrated example, HOE 210 receives infrared light and visible light directly from scan mirror 204. In other examples, alignment between scan mirror 204 and HOE 210 may include light directing optics. Such light directing optics may be needed, for example, if due to space constraints it is not possible to place the scan mirror 204 where a direct line of sight between the scan mirror 204 and HOE 210 that avoids obscuring features such as eyelids and eyelashes can be established. In other examples, beam shaping optics or beam replicating optics may be arranged in a path through which HOE 210 receives infrared light and visible light from scan mirror 204. For example, it may be desired to use a focusing lens to focus the scanning light from scan mirror 204 onto HOE 210.

Infrared detector 214 is mounted on arm 344. In the example shown in FIG. 3, infrared detector 214 is not integrated into scanning laser projector 201. However, it is possible to integrate infrared detector 214 into scanning laser projector 201, as explained for infrared detector 214a (in FIG. 2B) and scanning laser projector 201a (in FIG. 2B). In the examples shown in FIG. 3, there is a line of sight between infrared detector 214 and HOE 210 such that infrared detector 214 can receive infrared light directly from HOE 210. Advantageously, infrared detector 214 can be positioned on arm 344 such that the path through which infrared detector 214 receives infrared light from HOE 210 is free of obscuring features such as eyelids and eyelashes. In one example, there are no optical elements that deflect or redirect infrared light along a path through which infrared detector 214 receives infrared light from HOE 210. In another example, there may be optical elements that deflect or redirect infrared light along the receiving path of the infrared detector 214, e.g., due to space constraints on the arm 344 that prevent a direct line of sight between the infrared detector 214 and the HOE 210.

Processor(s) 222 and storage medium/media (or memory) 224 may be mounted on either of the arms 344, 346, subject to mounting space availability. In the example of FIG. 3, processor 222 and storage medium 224 are mounted on arm 346. The front frame 342 may include communication structures (not shown) to facilitate transfer of signals between the components mounted on arms 344, 346.

In use, laser module 203 provides both visible light and infrared light. Scan mirror 204 moves (e.g., oscillates) to scan both visible light and infrared light over eye 316 by scanning both visible light and infrared light over HOE 210, as explained for system 200 (in FIG. 2A). One or more features of eye 316 reflect the infrared light, where at least a portion of the reflection is received by HOE 210. Infrared detector 214 detects at least a portion of infrared light reflected from eye 316 by detecting infrared light reflected from HOE 210. The measurements made by infrared detector 214 are dependent on the position/orientation of eye 316 and can be used to track movements of eye. Processor 222 may receive signals from scanning laser projector 201 and infrared detector 214 and use the received signals to determine a gaze direction of eye 316. While HOE 210 is receiving infrared light and redirecting the infrared light to eye 316, infrared filter 221 blocks transmission of infrared wavelengths through HOE 210 from front side of HOE 210 as previously described with reference to FIGS. 2A and 2B, thereby reducing noise in the infrared light detected by infrared detector 214.

Figure 4A:
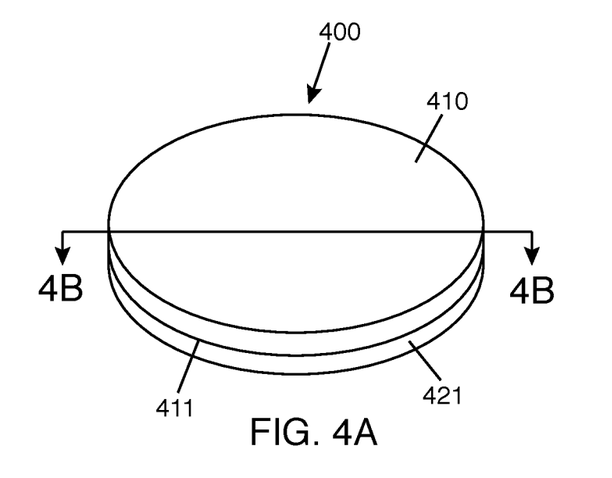
FIG. 4A is a perspective view of an optical filter including at least one hologram.
Figure 4B:
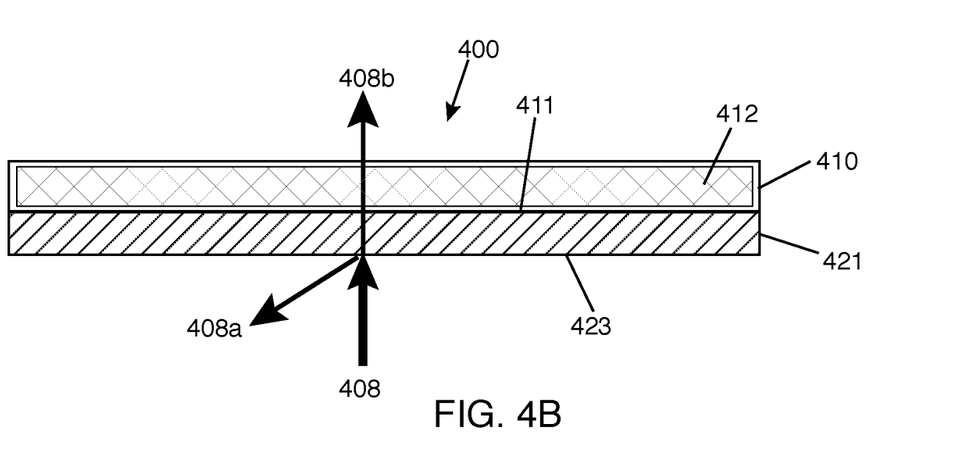
FIG. 4B is a cross-sectional view of the optical filter of FIG. 4A taken along line 4B-4B.

FIGS. 4A and 4B show an optical filter 400 including a HOE 410 and an infrared filter 421 disposed on or proximate a front side 411 of HOE 410. In one example, HOE 410 is a single volume of holographic material, e.g., photopolymer and/or a silver halide compound, in which at least one hologram 412 (in FIG. 4B) is encoded, carried, embedded, or generally included by holographic principles and processes. In one implementation, hologram 412 (in FIG. 4B) is an infrared hologram that is responsive to infrared light and unresponsive to visible light, where responsive and unresponsive have the meanings previously described with respect to hologram 112 (in FIG. 1A). In one implementation, infrared filter 421 is a material or structure that blocks infrared light. Infrared filter 421 may block infrared light while allowing visible light through. In one example, infrared filter 421 blocks infrared light by reflecting infrared light. In another example, infrared filter 421 may block infrared light by absorbing infrared light. Infrared filter 421 may block all infrared wavelengths or may block a subset of the infrared range. In one example, infrared filter 421 may block infrared light in a subset of infrared range to which the hologram 412 is responsive. For example, if hologram 412 responds to near infrared wavelengths, infrared filter 421 may be selected to block near infrared wavelengths. In another example, the subset of the infrared wavelengths that infrared filter 421 blocks may be dictated by the use environment of optical filter 400. For example, if optical filter 400 is used as HOE 110 (in FIG. 1A)/infrared filter 121 (in FIG. 1A), infrared filter 421 may be selected to block infrared wavelengths to which infrared detector 114 (in FIG. 1A) is sensitive or responsive. In one implementation, infrared filter 421 blocks transmission of infrared light to front side 411 of HOE 410 without absorbing infrared light from HOE 410.

FIG. 4B shows ambient light 408 impinging on a surface 423 of infrared filter 421. Infrared light 408a is reflected off the surface 423 of infrared filter 421 while the remainder of ambient light 408b, such as visible light, passes through HOE 410 from front side 411 of HOE 410. It should be noted that it is not necessary that infrared filter 421 reflects 100% of the target infrared range to be effective. In one example, infrared filter 421 may reflect at least 90% of the target infrared range. In another example, infrared filter 421 may reflect at least 80% of the target infrared range. Thus, filtered ambient light 408B may have some residual infrared light within the target infrared range, depending on the efficiency of infrared filter 421.

In the implementation where infrared filter 421 is disposed on front side 411 of HOE 410, infrared filter 421 may be in the form of a coating or thin film disposed on front side 411 of HOE 410. The coating or thin film may be monolayer or multilayer. For example, infrared filter 421 may be in the form of a multilayer dielectric coating or thin film that selectively reflects infrared light while allowing the remainder of ambient light, such as visible light, to pass through. The method of disposing infrared filter 421 on front side 411 of HOE 410 may include, for example, deposition, coating, and/or lamination processes. In general, the method of disposing may include any method of keeping the infrared filter 421 and HOE 410 as an integral unit.

Figure 5:
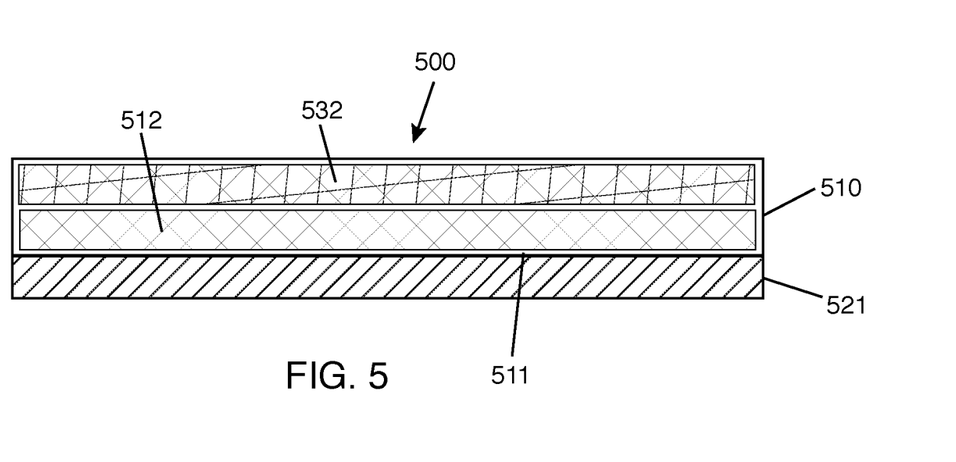
FIG. 5 is a cross-sectional view of an optical filter including at least two holograms.

FIG. 5 shows an optical filter 500 including a HOE 510 and an infrared filter 521 disposed on or proximate a front side 511 of HOE 510. The main difference between optical filter 500 and optical filter 400 (in FIGS. 4A and 4B) is in the HOE 510, which has two different types of holograms—at least one infrared hologram 512 that is responsive to infrared light and unresponsive to visible light and at least one visible hologram 532 that is responsive to visible light and infrared light, where responsive and unresponsive have the meanings previously described with respect to hologram 112 (in FIG. 1A). Both holograms 512, 532 may be encoded, carried, embedded, or generally included in a single volume of holographic material, e.g., photopolymer and/or a silver halide compound. Infrared filter 521 may have the same characteristics as explained for infrared filter 421 (in FIGS. 4A and 4B) and may be disposed on or proximate front side 511 of HOE 510 as explained for infrared filter 421.

Figure 6A:
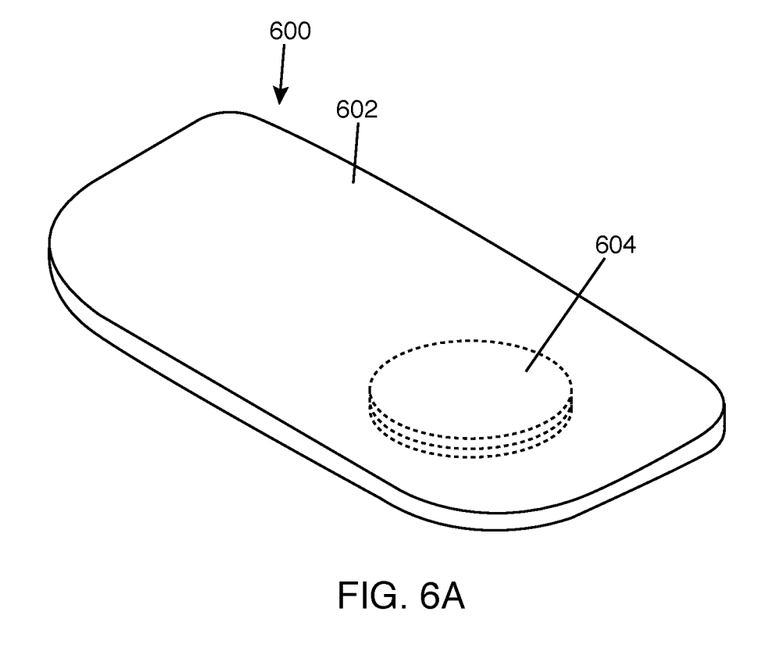
FIG. 6A is a perspective view of a transparent lens with an embedded optical filter

FIG. 6A shows a transparent lens 600 including a lens body 602 and an optical filter 604 integrated with the lens body 602. "Transparent," herein, means at least transparent to visible light. Lens 600 may be selectively transparent to other wavelengths outside of the visible range. Lens 600 may be an eyeglass lens, which may or may not have a prescription. Optical filter 604 may be any one of optical filter 400 (in FIGS. 4A and 4B) and optical filter 500 (in FIG. 5). Lens body 602 may be made of any suitable lens material, such as polycarbonate or glass, in any suitable lens shape.

Figure 6B:
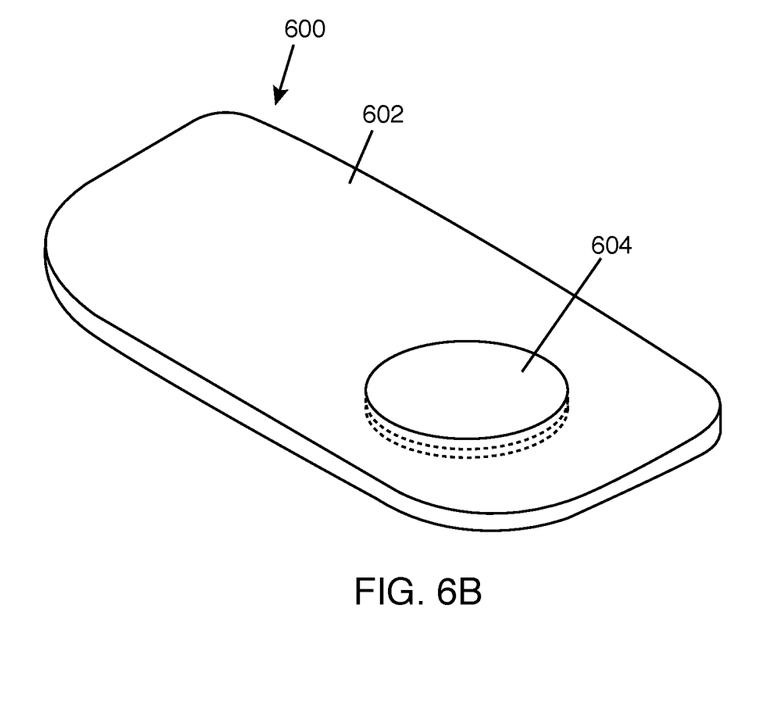
FIG. 6B is a perspective view of a transparent lens with an embedded optical filter with a surface of the optical filter exposed.

In the illustrated example, optical filter 604 is embedded in lens body 602. The embedding process may involve molding lens body 602 around optical filter 604. In one example, embedded means that the optical filter 604 is wholly contained within the lens body 602, as shown in FIG. 6A. In another example, embedded means that the optical filter 604 is mostly contained within the lens body 602, e.g., a surface of the optical filter 604 may be exposed on one side of lens body 602 while the remainder of the optical filter 604 is within the lens body 602 as shown in FIG. 6B. The exposed surface of optical filter 604 may, or may not, be flush with the lens body 602. In other examples, the optical filter 604 may be laminated on a surface or between layers of lens body 602 or otherwise attached or mounted to lens body 602 such that it becomes an integral part of lens 600.

Figure 6C:
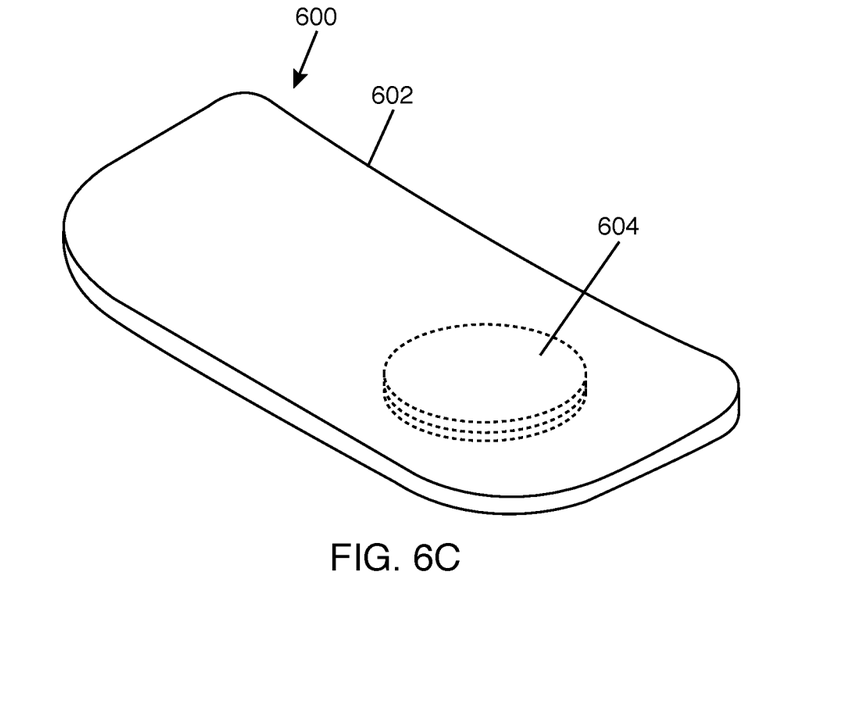
FIG. 6C is a perspective view of a transparent curved lens with an embedded optical filter.

Lens 600 appears flat in FIGS. 6A and 6B. However, in other examples, such as shown in FIG. 6C, lens 600 may have a curvature, which means that optical filter 604 and lens body 602 may have a curvature, for example a curvature about an axis that is perpendicular to an optical axis of the lens 600. For example, eyeglass lenses commonly have curvatures. Where lens 600 is an eyeglass lens, for example, lens 600 may have a curvature.

Figure 7:
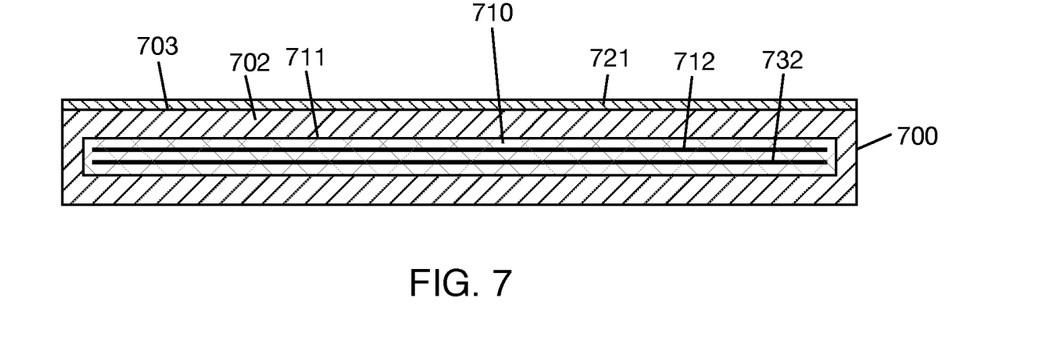
FIG. 7 is a cross-sectional view of a transparent lens with an embedded holographic optical element and an infrared filter on a surface of the transparent lens.

FIG. 7 shows a transparent lens 700 including a lens body 702 and a HOE 710 embedded in the lens body 702. HOE 710 may include one or more holograms, e.g., infrared hologram 712 and visible hologram 732. Infrared filter 721 is disposed on a front surface 703 of lens body 702 that is proximate, or in front of, a front side 711 of HOE 710. In this position, infrared filter 721 will selectively block transmission of infrared wavelengths through HOE 710 from front side 711 of HOE 710. Infrared filter 721 may have any or all of the characteristics described above for the other infrared filters 121, 221, 421, 521. Infrared filter 721 may be in the form of a coating or thin film disposed on surface 703 of lens body 702.

Optical filters 400, 500, as described in FIGS. 4A, 4B, and 5, and variations thereof, lens 600, as described in FIGS. 6A-6C, and lens 700 as described in FIG. 7 may be used in the eye tracking/content display systems described above. For example, it will be recognized that lens 600 (in FIGS. 6A-6C) or lens 700 (in FIG. 7) could be used as lens 348 (in FIG. 3). It will also be recognized that optical filter 400 (in FIGS. 4A and 4B) could be used as HOE 110/infrared filter 121 (in FIGS. 1A and 1B). It will also be recognized that optical filter 500 (in FIG. 5) could be used as HOE 210/infrared filter 221 (in FIGS. 2A and 2B).

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. An eye tracking system for tracking an eye of a user, comprising:
    at least one infrared laser diode to output an infrared light;
    an optical scanner positioned to receive the infrared light outputted by the at least one infrared laser diode and controllable to scan the infrared light over a target area;
    a holographic optical element positioned at the target area to receive the infrared light scanned by the optical scanner and to redirect the infrared light in a direction of the eye of the user, wherein the holographic optical element has a back side configured to face toward the eye and a front side opposite to the back side configured to face away from the eye;
    an infrared detector aligned to detect at least a portion of the infrared light returned from the eye; and
    a multilayer infrared filter disposed in a position to selectively block transmission of infrared wavelengths through the holographic optical element from a side of the holographic optical element, wherein the infrared filter is disposed on or proximate the front side of the holographic optical element to selectively block additional transmission of additional infrared wavelengths through the front side of the holographic optical element without absorbing a percentage of the additional infrared wavelengths from the holographic optical element.

2. The eye tracking system of claim 1, wherein the infrared detector is sensitive to a select range of infrared wavelengths, and wherein the infrared filter blocks transmission of infrared wavelengths in the select range of infrared wavelengths.

3. The eye tracking system of claim 1, wherein the infrared detector is aligned to receive the at least a portion of the infrared light returned from the eye from the holographic optical element.

4. The eye tracking system of claim 3, further comprising an additional infrared filter disposed in a path through which the infrared detector receives infrared light from the holographic optical element, wherein the additional infrared filter removes unwanted infrared wavelengths from the infrared light detected by the infrared detector.

5. The eye tracking system of claim 1, wherein the infrared filter is physically coupled to the front side of the holographic optical element.

6. The eye tracking system of claim 1, further comprising at least one transparent lens having a body, wherein the holographic optical element and the infrared filter are embedded in the body of the at least one transparent lens.

7. The eye tracking system of claim 1, further comprising at least one transparent lens having a body, wherein the holographic optical element is embedded in the body of the at least one transparent lens, and wherein the infrared filter is disposed on a surface of the body of the at least one transparent lens.

8. The eye tracking system of claim 1, wherein the holographic optical element comprises at least one infrared hologram that is responsive to infrared light and unresponsive to visible light.

9. The eye tracking system of claim 8, wherein the holographic optical element further comprises at least one visible hologram that is responsive to visible light and unresponsive to infrared light.

10. The eye tracking system of claim 9, further comprising at least one visible laser diode to output a visible light, wherein the optical scanner is positioned to receive both the infrared light outputted by the at least one infrared laser diode and the visible light outputted by the at least one visible laser diode.

11. An eyeglass lens, comprising:
a holographic optical element, wherein the holographic optical element has a back side configured to face toward an eye and a front side opposite to the back side configured to face away from the eye;
a multilayer infrared filter disposed in a position to selectively block transmission of infrared wavelengths through the holographic optical element from a side of the holographic optical element, wherein the infrared filter is disposed on or proximate the front side to selectively block additional transmission of additional infrared wavelengths through the front side of the holographic optical element without absorbing a percentage of the additional infrared wavelengths from the holographic optical element; and
a transparent lens having a body, wherein the holographic optical element and the infrared filter are physically coupled to the body.

12. The eyeglass lens of claim 11, wherein the holographic optical element and the infrared filter are embedded in the body.

13. The eyeglass lens of claim 11, wherein the holographic optical element is embedded in the body, and the infrared filter is disposed on a surface of the body.

14. The eyeglass lens of claim 11, wherein the holographic optical element comprises at least one infrared hologram that is responsive to infrared light and unresponsive to visible light.

15. The eyeglass lens of claim 14, wherein the holographic optical element further comprises at least one visible hologram that is responsive to visible light and unresponsive to infrared light.

16. A wearable heads-up display having a field of view, the wearable heads-up display comprising:
a head wearable support frame that when worn positions the field of view with respect to at least one eye;
at least one infrared laser diode coupled to the support frame and operable to output an infrared light;
at least one visible laser diode coupled to the support frame and operable to output a visible light;
at least one scan mirror coupled to the support frame and positioned to receive both the infrared light and the visible light outputted by the at least one infrared laser diode and by the at least one visible diode, respectively, and operable to controllably reflect both the infrared light and the visible light;
a holographic optical element coupled to the support frame and positioned to receive the infrared light and the visible light reflected by the at least one scan mirror and redirect the infrared light and the visible light to the eye, wherein the holographic optical element has a back side configured to face toward the at least one eye and a front side opposite to the back side configured to face away from the at least one eye;
an infrared detector coupled to the support frame and positioned to detect at least a portion of infrared light returned from the eye; and
a multilayer infrared filter disposed in a position to selectively block transmission of infrared wavelengths through the holographic optical element from a side of the holographic optical element, wherein the infrared filter is disposed on or proximate the front side to selectively block additional transmission of additional infrared wavelengths through the front side of the holographic optical element without absorbing a percentage of the additional infrared wavelengths from the holographic optical element.

17. The wearable heads-up display of claim 16, further comprising at least one transparent lens coupled to the support frame, the at least one transparent lens having a body, wherein the holographic optical element and the infrared filter are embedded in the body.

18. The wearable heads-up display of claim 16, further comprising at least one transparent lens coupled to the support frame, the at least one transparent lens having a body, wherein the holographic optical element is embedded in the body, and wherein the infrared filter is disposed on a surface of the body.

19. The wearable heads-up display of claim 16, wherein the support frame includes a front frame and a pair of arms coupled to opposite sides of the front frame, and wherein the infrared detector is mounted on one of the arms of the support frame.

20. The wearable heads-up display of claim 16, wherein the infrared detector is aligned to receive the at least a portion of the infrared light returned from the eye from the holographic optical element.

21. A method for tracking an eye of a user, comprising:
outputting an infrared light;
controllably reflecting the infrared light by at least one scan mirror;
receiving the infrared light reflected by the at least one scan mirror at a first side of a holographic optical element and redirecting the infrared light to the eye of the user by the holographic optical element;
selectively blocking transmission of infrared light through the holographic optical element from a second side of the holographic optical element by a multilayer infrared filter disposed on or proximate the second side without absorbing a percentage of additional infrared wavelengths from the holographic optical element, wherein the holographic optical element has a back side configured to face toward the eye and a front side opposite to the back side configured to face away from the eye, the second side comprising the front side opposite to the back side;
detecting at least a portion of infrared light returned from the eye of the user; and
determining a position of at least one feature of the eye based on the at least a portion of infrared light detected from the eye of the user.

22. The method of claim 21, wherein the holographic optical element comprises at least one infrared hologram that is responsive to infrared light and unresponsive to visible light.

23. The method of claim 21, wherein detecting at least a portion of infrared light returned from the eye of the user comprises detecting infrared light reflected from the holographic optical element.

24. The method of claim 21, wherein detecting at least a portion of infrared light returned from the eye of the user is by an infrared detector, and wherein selectively blocking transmission of infrared light comprises blocking infrared wavelengths to which the infrared detector is sensitive.

25. The method of claim 21, wherein outputting an infrared light includes outputting an infrared light in a select subset of the infrared range, and further comprising filtering unwanted infrared wavelengths from the at least a portion of infrared light detected from the eye of the user, the unwanted infrared wavelengths being outside of the select subset of the infrared range.

* * * * *